(12) United States Patent
Matsushita

(10) Patent No.: US 10,268,424 B2
(45) Date of Patent: Apr. 23, 2019

(54) DETERMINING EJECTION ORDER OF RECORDING SHEETS BASED ON PREDICTED RASTERIZATION TIME

(71) Applicant: Konica Minolta, Inc., Chiyoda-ku, Tokyo (JP)

(72) Inventor: Kouichirou Matsushita, Hino (JP)

(73) Assignee: Konica Minolta, Inc., Chiyoda-ku, Tokyo (JP)

(*) Notice: Subject to any disclaimer, the term of this patent is extended or adjusted under 35 U.S.C. 154(b) by 0 days.

(21) Appl. No.: 15/864,122

(22) Filed: Jan. 8, 2018

(65) Prior Publication Data

US 2018/0217792 A1 Aug. 2, 2018

(30) Foreign Application Priority Data

Jan. 31, 2017 (JP) ................. 2017-015074

(51) Int. Cl.
*G06F 3/12* (2006.01)
*G03G 15/00* (2006.01)
*G06K 15/02* (2006.01)

(52) U.S. Cl.
CPC .......... *G06F 3/1215* (2013.01); *G03G 15/50* (2013.01); *G06F 3/1252* (2013.01); *G06F 3/1279* (2013.01); *G06K 15/1823* (2013.01); *G06K 15/1836* (2013.01); *G06K 15/1856* (2013.01); *G03G 15/5083* (2013.01); *G06F 3/124* (2013.01)

(58) Field of Classification Search
CPC ...... G06F 3/1215; G06F 3/124; G06F 3/1252; G06K 15/1823; G06K 15/1861
See application file for complete search history.

(56) References Cited

U.S. PATENT DOCUMENTS 9,207,891 B1* 12/2015 Dennison ............. G06F 3/1243
2016/0210087 A1* 7/2016 Amir .................... G06F 3/1217

FOREIGN PATENT DOCUMENTS

JP 2011-51234 A 3/2011
JP 2013-161096 A 8/2013

* cited by examiner

*Primary Examiner* — Eric A. Rust
(74) *Attorney, Agent, or Firm* — Buchanan Ingersoll & Rooney PC

(57) ABSTRACT

An image forming apparatus includes: rasterization processors that rasterize input image data and generate raster image data; a predictor that predicts a rasterization processing time required for the rasterization processors to rasterize input image data of a unit to be subjected to an image formation process on each recording paper sheet; a hardware processor that determines an order in which the rasterization processors rasterize the input image data of the unit; an image former that performs the image formation process based on the raster image data; a sheet ejection processor that acquires, from the image former, each recording paper sheet subjected to the image formation process, and performs a sheet ejection process; and the hardware processor that determines an order of the recording paper sheets to be ejected by the sheet eject processor, to adjust the order of the recording paper sheets to an order of pages.

11 Claims, 8 Drawing Sheets

FIG. 5A

| | | | | | | | | |
|---|---|---|---|---|---|---|---|---|
| RASTERIZATION PROCESS (RIP) (1) | (1) | (3) | (4) | (5) | (6) | (8) | (9) | |
| RASTERIZATION PROCESS (RIP) (2) | | (2) | | | | (7) | | |
| IMAGE FORMATION PROCESS | (1) | (2) | (3) | (4) | (5) | (6) | (7) | (8) (9) |
| SHEET EJECTION PROCESS | (1) | (2) | (3) | (4) | (5) | (6) | (7) | (8) (9) |

FIG. 5B

| | | | | | | | | |
|---|---|---|---|---|---|---|---|---|
| RASTERIZATION PROCESS (RIP) (1) | (1) | (3) | (4) | (5) | (6) | (8) | (9) | |
| RASTERIZATION PROCESS (RIP) (2) | | (2) | | | | (7) | | |
| IMAGE FORMATION PROCESS | (1) | (2) | (3) | (4) | (5) | (6) | (8) (9) | (7) |
| SHEET EJECTION PROCESS | (1) | (2)(3) | (4) | (5) | (6) | (7)(8)(9) | | |

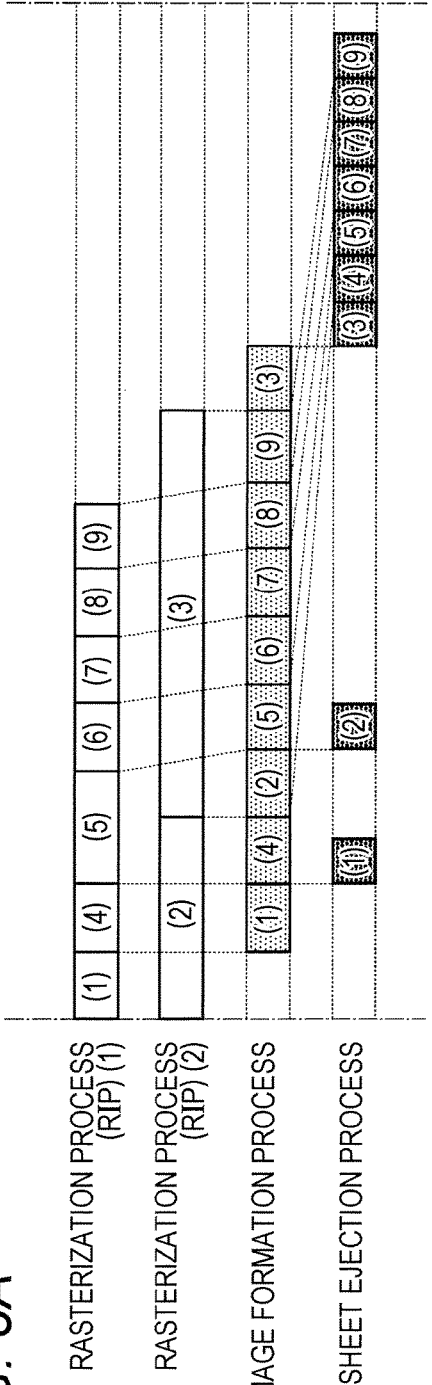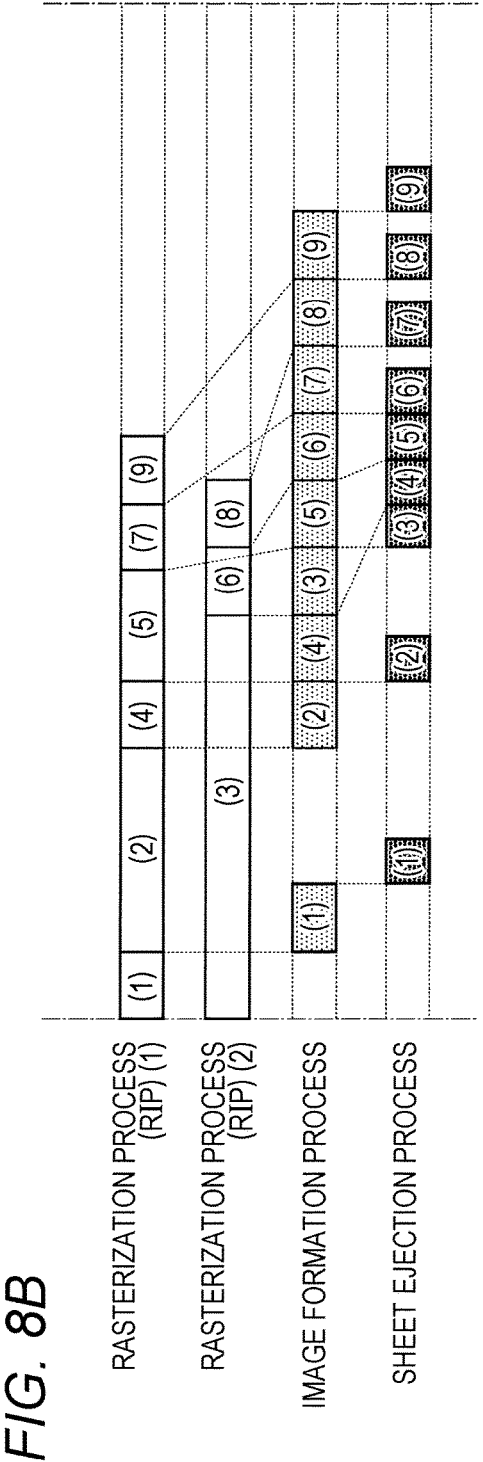
FIG. 8A
FIG. 8B

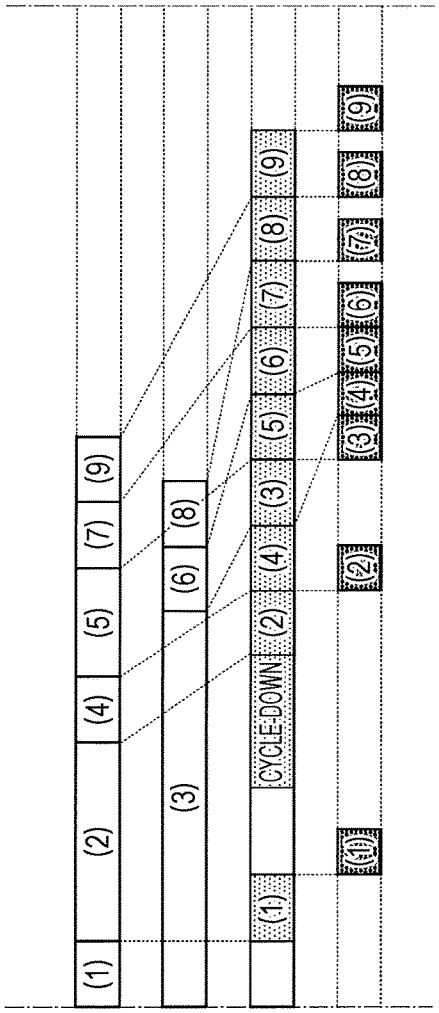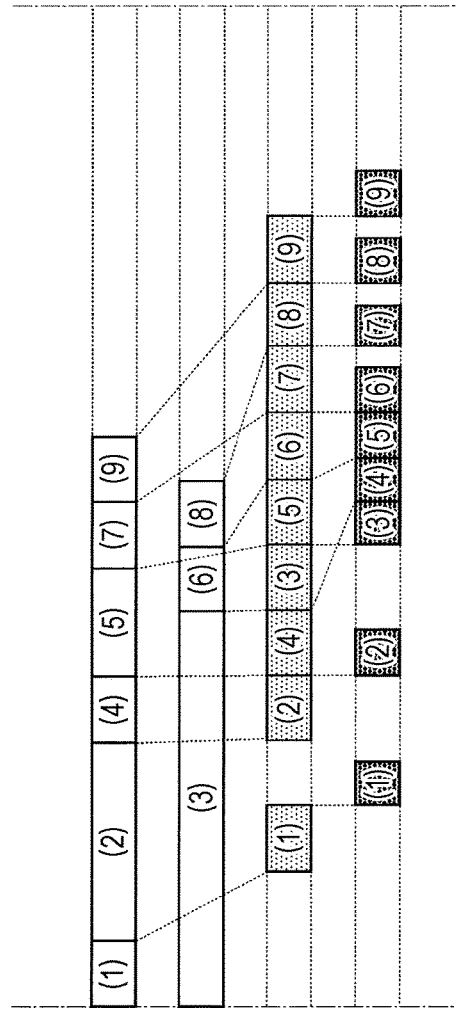

DETERMINING EJECTION ORDER OF RECORDING SHEETS BASED ON PREDICTED RASTERIZATION TIME

The entire disclosure of Japanese patent Application No. 2017-015074, filed on Jan. 31, 2017, is incorporated herein by reference in its entirety.

BACKGROUND

Technological Field

The present invention relates to an image forming apparatus, an image forming method, and a program for the image forming apparatus.

Description of the Related Art

A print processing time depends not only on the mechanical processing speed in the image formation process, the recording paper sheet ejection process, or the like, but also on the rasterization processing time for input image data. Even if the mechanical processing speed of a printing device is increased, the printing device does not start a printing process until the rasterization process is completed. Therefore, in a case where a long time is required for the rasterization process, the standby state lasts long. Particularly, in a printing device for production printing that is being widely spread recently, the amount of data of a captured image is larger than that in a printing device for office use, often resulting in a load on the rasterization process. This trend is becoming conspicuous in printing devices for production printing.

In recent years, raster image processors (RIPs) that perform rasterization processes have become multicore RIPs. Therefore, rasterization processes are performed in parallel with multiple cores, to shorten the time required for the rasterization processes. In this manner, the print processing time of a printing device is shortened. For example, according to the technology disclosed in JP 2013-161096 A, in an image forming apparatus that performs rasterization processes in parallel, the order in which rasterization processes are performed is changed from the order of the pages in image data to the order of the images to be formed on recording paper sheets. In this manner, the print processing time is shortened. According to the technology disclosed in JP 2011-51234 A, in an image forming apparatus that performs rasterization processes in parallel, the assignment of the images to the respective cores of the RIPS that perform rasterization processes is dynamically changed in accordance with the time required for rasterizing the images in a standby state. In this manner, a higher efficiency is achieved.

However, in a case where a long time is required for rasterizing image data with a large data amount such as high-quality image data, even if parallel rasterization processes are performed, the time required for rasterizing the image becomes a bottleneck in shortening the print processing time, and still remains a cause of the standby time in a printing process.

In JP 2013-161096 A and JP 2011-51234 A, the rasterization processing speed is increased from the viewpoint that the bottleneck in the printing processing time lies in rasterization processes these days. However, the time required for each image formation process in the printing device is not taken into account in optimizing the rasterization processing speed.

In a printing process, the pages in the final form of a printed material should be arranged in the order of the pages in the input image data. In a conventional technology, image formation processes are performed in the order of the pages so that the pages in the final form of the printed material are in the order of the pages in the input image data. However, in the case of a printing process involving a page that requires a long rasterization processing time, printing of the other pages that follow the page cannot be started until the image formation process for the page is completed.

SUMMARY

The present invention has been made in view of the above problems, and an object thereof is to provide an image forming apparatus, an image forming method, and a program for an image forming apparatus that are capable of optimizing a print processing time by predicting rasterization processing times required for rasterizing respective sets of input image data, image formation processing times required for performing image formation processes on recording paper sheets in accordance with the respective sets of input image data, and sheet ejection processing times required for performing sheet ejection processes on the recording paper sheets having images formed thereon, and determining the order in which a multicore RIP starts rasterization processes on the respective sets of input image data.

To achieve the abovementioned object, according to an aspect of the present invention, an image forming apparatus reflecting one aspect of the present invention comprises:

a plurality of rasterization processors that rasterize, in parallel, input image data having page information including page order information, and generate raster image data;

a predictor that predicts a rasterization processing time required for the rasterization processors to rasterize input image data of a unit to be subjected to an image formation process on each recording paper sheet;

a hardware processor that determines an order in which the rasterization processors rasterize, in parallel, the input image data of the unit to be subjected to the image formation process on recording paper sheets;

an image former that performs the image formation process based on the raster image data in an order in which the rasterization processors have finished the rasterization processes on the input image data of the unit to be subjected to the image formation process on recording paper sheets;

a sheet ejection processor that acquires, from the image former, each recording paper sheet subjected to the image formation process by the image former, and performs a sheet ejection process; and the hardware processor that determines an order of the recording paper sheets to be ejected by the sheet eject processor, to adjust the order of the recording paper sheets to an order of pages included in the page information, wherein, in accordance with the rasterization processing time predicted by the predictor, the hardware processor determines such an order that a time from a start of a rasterization process till an end of the sheet ejection process becomes shorter than a time from a start of a rasterization process performed by the rasterization processors performing rasterization processes in the order of the pages included in the page information till the end of the sheet ejection process.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 4A shows a timing chart of a case where rasterizing process for the respective sets of input image data are started in the order according to the page numbers, and FIG. 4B shows a timing chart of a case where the time required for rasterizing each set of input image data is taken into consideration when the order in which the rasterization processes for the respective sets of input image data is changed;

FIGS. 5A and 5B are timing charts relating to parallel rasterization processes, image formation processes, and sheet ejection processes in a printing process, FIG. 5A is a timing chart in a case where the order in which rasterization processes are performed is changed by taking into account the time required for rasterizing the respective sets of input image data, image formation processes based on raster image data subjected to the rasterization process are performed in the order of pages, and the recording paper sheets having images formed thereon are ejected, and FIG. 5B is a timing chart in a case where the order in which rasterization processes are performed is changed by taking into account the time required for rasterizing the respective sets of input image data, image formation processes are sequentially performed starting from raster image data subjected to the rasterization processes, and the recording paper sheets having images formed thereon are ejected in the order of pages;

FIG. 7A is a timing chart in a case where the order in which rasterization processes are performed is changed by taking into account the time required for rasterizing the respective sets of input image data, image formation processes based on raster image data subjected to the rasterization process are performed in the order of pages, and the recording paper sheets having images formed thereon are ejected, and FIG. 7B is a timing chart in a case where the order in which rasterization processes are performed is changed by taking into account rasterization processing times and image formation processing times, image formation processes are sequentially performed starting from raster image data subjected to the rasterization processes, and the recording paper sheets having images formed thereon are ejected in the order of pages;

FIGS. 8A and 8B are timing charts relating to parallel rasterization processes, image formation processes, and sheet ejection processes in a printing process, FIG. 8A is a timing chart in a case where the order in which rasterization processes are performed is changed by taking into account rasterization processing times and image formation processing times, image formation processes are sequentially performed starting from raster image data subjected to the rasterization processes, and the recording paper sheets hav-ing images formed thereon are ejected in the order of pages, and FIG. 8B is a timing chart in a case where rasterization processing times, image formation processing times, and sheet ejection processing times are taken into account, image formation processes are sequentially performed starting from raster image data subjected to the rasterization processes, and the recording paper sheets having images formed thereon are ejected in the order of pages; and FIGS. 9A and 9B are timing charts relating to parallel rasterization processes, image formation processes, and sheet ejection processes in a printing process, FIG. 9A is a timing chart in a case where the order in which rasterization processes are performed is changed by taking into account rasterization processing times, image formation processing times, and sheet ejection processing times, image formation processes are sequentially performed starting from raster image data subjected to the rasterization processes, and the recording paper sheets having images formed thereon are ejected in the order of pages, and FIG. 9B is a timing chart in a case where the order in which rasterization processes are performed is changed by taking into account rasterization processing times, image formation processing times, sheet ejection processing times, and activation of a cycle-down system, image formation processes are sequentially performed starting from raster image data subjected to the rasterization processes, the timing to start each image formation process is adjusted, and the recording paper sheets having images formed thereon are ejected in the order of pages.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
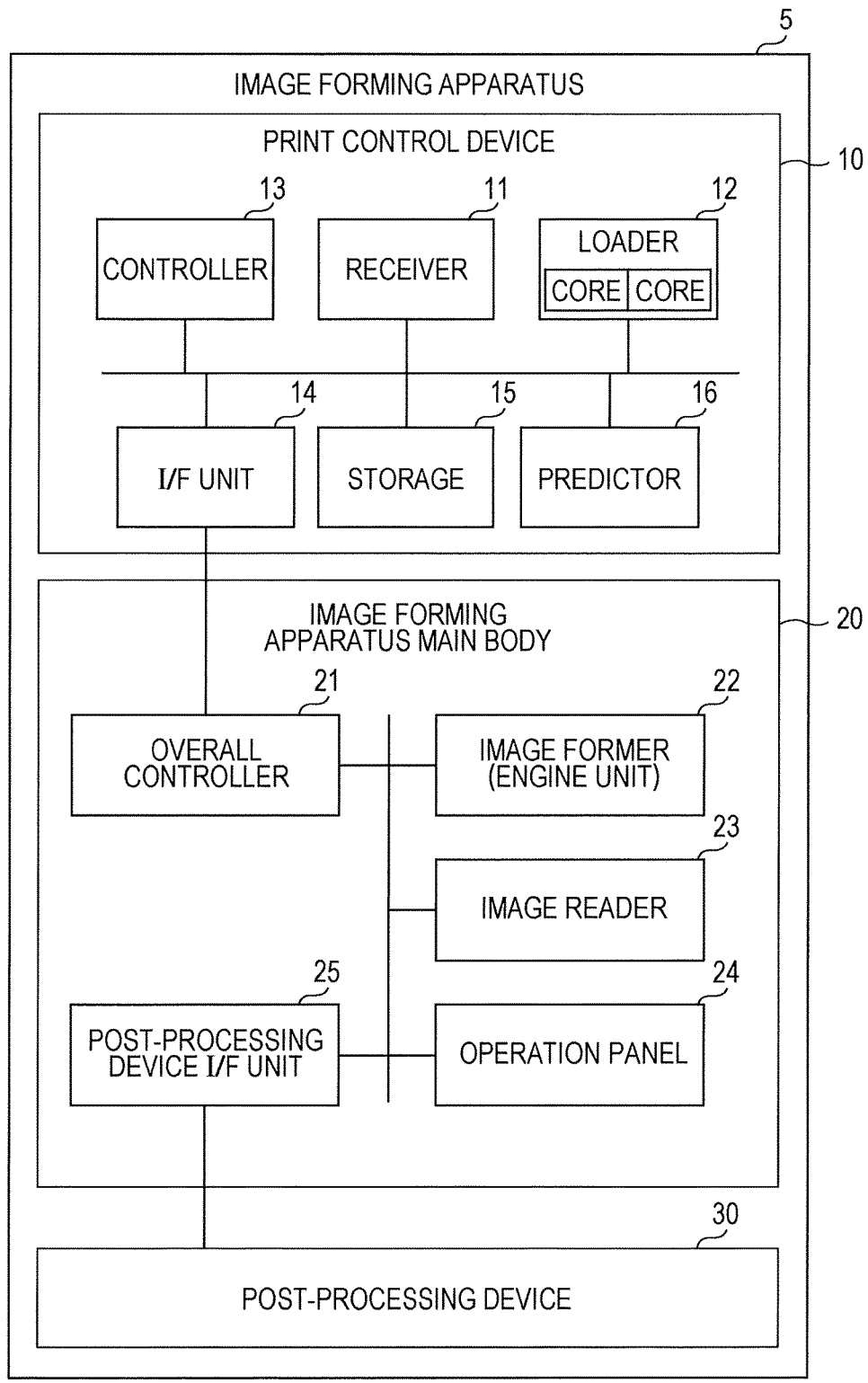
FIG. 1 is a block diagram of an image forming apparatus according to an embodiment of the present invention.
Figure 2:
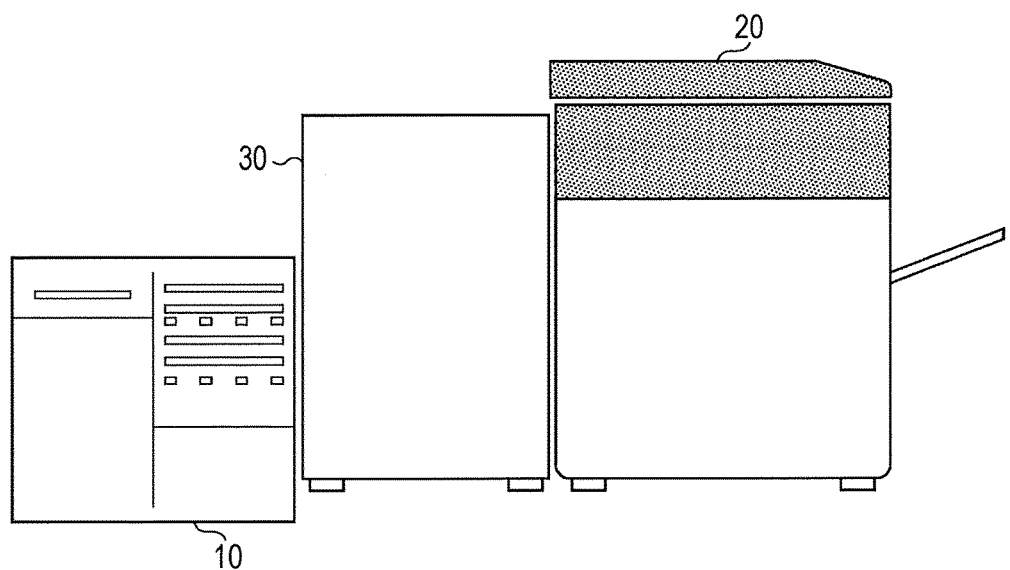
FIG. 2 is a schematic diagram showing the image forming apparatus that includes a print control device, an image forming apparatus main body, and a post-processing device according to an embodiment of the present invention.

FIG. 1 is a block diagram of an image forming apparatus 5 according to an embodiment of the present invention. FIG. 2 shows an example configuration of the image forming apparatus 5 according to the embodiment of the present invention.

The image forming apparatus 5 includes a print control device 10 that receives a print job and generates raster image data by rasterizing each set of the image data of a unit on the basis of which an image is formed on a recording paper sheet, an image forming apparatus main body 20 that forms an image on a recording paper sheet in accordance with the image data generated by the print control device 10, and a post-processing device 30 that subjects the recording paper sheet output from the image forming apparatus main body 20 to post processing such as a bookbinding process.

Although the image forming apparatus 5 according to this embodiment is formed with a combination of the print control device 10, the image forming apparatus main body 20, and the post-processing device 30, the present invention is not limited to this form, and these components may be integrally formed.

The image forming apparatus 5 is connected to an information processing device such as a computer through a network such as a local area network (LAN), and receives a print job from the information processing device. The print job contains an instruction as to an operation of the image forming apparatus 5. The image data of each input image page included in the print job describes the contents of each set of the image data in the page description language, and is information about the image to be printed on a recording paper sheet.

The print control device 10 is formed by connecting a receiver 11, a loader 12, a controller 13, an interface (I/F) unit 14, a storage 15, and a predictor 16. The controller 13 is equivalent to the "controller" of an embodiment of the present invention, the loader 12 is equivalent to the "rasterization processors" of an embodiment of the present invention, the storage 15 is equivalent to the "storage" and the "print job memory" of an embodiment of the present invention, and the predictor 16 is equivalent to the "predictor" of an embodiment of the present invention.

The receiver 11 receives a print job from the information processing device connected via the network.

The loader 12 includes RIPs, and generates raster image data by rasterizing each set of the input image data included in the print job. The loader 12 has multicore RIPs, and rasterizes the input image data in parallel, using the RIPs. Further, the loader 12 also performs parallel rasterization on the image data acquired by the image forming apparatus main body 20 with the later described image reader 23.

The controller 13 is formed with a central processing unit (CPU) or the like, and controls the order in which the loader 12 starts rasterization of each set of the image data of the print job. Specifically, the controller 13 controls the order in which parallel rasterization is performed on each set of the image data of each page for forming an image on a recording paper sheet. This control is directed to the loader 12 that performs multicore, parallel rasterization.

The I/F unit 14 exchanges various data between the print control device 10 and the image forming apparatus main body 20. The raster image data generated by the print control device 10 is transferred to the image forming apparatus main body 20 via the I/F unit 14.

The storage 15 is formed with a read only memory (ROM), a random access memory (RAM), a nonvolatile memory, a hard disk device, or the like. The program to be executed by the CPU of the controller 13 is stored in the storage 15. As the CPU of the controller 13 executes the program, the functions of the print control device 10 are achieved. The storage 15 stores the print job received by the receiver 11, the raster image data loaded by the loader 12, intermediate data generated during the loading, and the like. The storage 15 is also used as a work area for storing various kinds, of data when the CPU of the controller 13 executes the program.

The predictor 16 predicts the rasterization processing time required for rasterizing each set of the unit image data for forming an image on a recording paper sheet, with the unit image data being contained in the print job received by the receiver 11. In a case where fine-grained image data is rasterized, for example, the rasterization processing time is long if the resolution in the print settings is high. On the other hand, if the resolution in the print settings is low, the rasterization processing time is short. The rasterization processing time is predicted by referring to the amount of each set of the image data to be output onto a recording paper sheet. Specifically, in imposition printing such as 2-in-1, the image data of each page for forming an image on a recording paper sheet is regarded as one unit, and the rasterization processing time is predicted. The rasterization processing time is predicted when a print job is received.

The image forming apparatus main body 20 is a so-called multifunction peripheral that has a copying function of optically reading a document and printing the duplicated image on a recording paper sheet, a scanning function of saving the image data of the read document as a file, or transmitting the image data to an external terminal through the network, and a printing function of forming an image based on raster image data transferred from the print control device 10 on a recording paper sheet and thus outputting the image.

The image forming apparatus main body 20 is formed by connecting an overall controller 21, an image former 22, an image reader 23, an operation panel 24, a post-processing device I/F unit 25, and the like. The overall controller 21 is equivalent to the "image formation controller" of an embodiment of the present invention, and the image former 22 is equivalent to the "image former" of an embodiment of the present invention.

The overall controller 21 includes a CPU, a ROM, a RAM, a nonvolatile memory, a hard disk device, an I/F unit for the print control device 10, a network communicator, and the like. As the CPU executes the program stored in the ROM or the like, operation of the image forming apparatus main body 20 is controlled.

The image former 22 is an engine unit that functions to form and print, on a recording paper sheet, an image corresponding to the raster image data transferred via the I/F unit 14 of the print control device 10. In this example, the image former 22 is formed as a laser printer that includes a recording paper sheet conveyance device, a photosensitive drum, a charging device, a laser unit, a development device, a transfer/separation device, a cleaning device, and a fixing device. The laser printer performs image formation through an electrophotographic process. The image former 22 may be of some other type.

The image reader 23 functions to acquire the corresponding image data by optically reading a document. The image data acquired by the image reader 23 is transferred via the I/F unit of the print control device 10, and is stored into the storage 15.

The operation panel 24 includes a display and an operation unit. The display is formed with a liquid crystal display or the like, and functions to display various kinds of operation screens, setting screens, and the like. The operation unit is formed with various operation switches such as a start button, a touch panel provided on the display surface of the display, and the like. The touch panel detects a coordinate position pressed with a touch pen, a finger, or the like.

The post-processing device I/F unit 25 functions to transmit and receive instructions and the like relating to post-processing, to and from the post-processing device 30. An instruction from the overall controller 21 and an operation from the operation panel 24 are transmitted via the post-processing device I/F unit 25.

The post-processing device 30 stacks recording paper sheets output from the image forming apparatus main body 20, and performs a bookbinding process on these recording paper sheets, for example. The bookbinding process can be performed in a bookbinding mode such as saddle stitching, side stitching, adhesive binding, or ring binding. The post-processing device 30 includes conveyance paths 31a and 31b, a sheet ejecting conveyor 32, and a sheet ejector 33.

The sheet ejecting conveyor 32 is controlled by the overall controller 21 so that the post-processing device 30 transports a recording paper sheet output from the image forming apparatus main body 20 to the post-processing position, and conveys a finished product subjected to the bookbinding process, to the sheet ejector 33 provided outside the post-processing device 30.

Further, the sheet ejecting conveyor 32 can change the order in the sheet ejection process to be performed on recording paper sheets received from the image forming apparatus main body 20.

Figure 3:
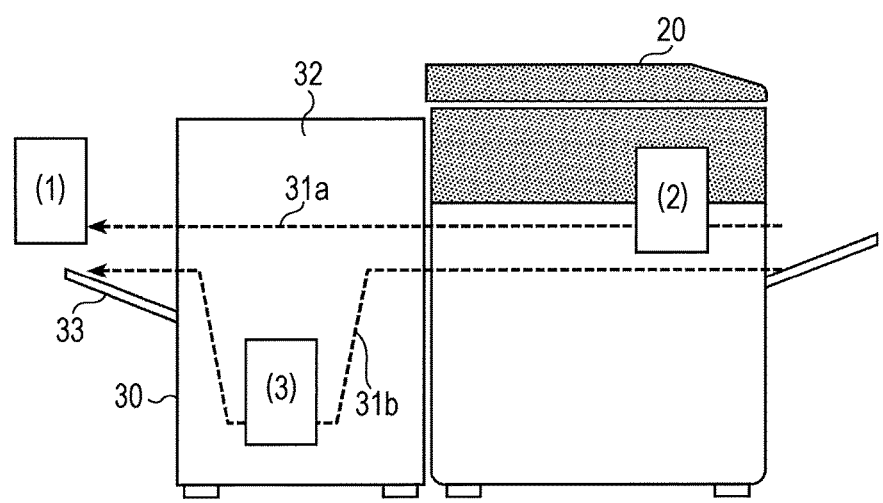
FIG. 3 is a schematic diagram of a configuration for changing the order in which the post-processing device ejects three recording paper sheets.

As a specific example, a case where three images corresponding to page numbers (1), (2), (3) are subjected to an image formation process in the order of (1), (3), and (2) as shown in FIG. 3 is described below.

First, the recording paper sheet having the image (1) formed thereon is ejected to the sheet ejector 33 by the sheet ejecting conveyor 32. The recording paper sheet having the image (3) formed thereon immediately after the image (1) does not match the page numbers, and therefore, is not subjected to the sheet ejection process immediately after the image (1). The recording paper sheet having the image (3) formed thereon is conveyed to the conveyance path 31b of the conveyance paths 31a and 31b, so that the ejection order of the recording paper sheets is changed. The recording paper sheet having the image (3) formed thereon is put into a standby state in the conveyance path 31b, so that the recording paper sheet having the image (3) formed thereon is ejected after the recording paper sheet having the image (2) formed thereon is ejected to the sheet ejector 33. The sheet ejecting conveyor 32 resumes the conveyance at an appropriate timing, so the recording paper sheet having the image (3) formed thereon is ejected to the sheet ejector 33 after the recording paper sheet having the image (2) formed thereon is ejected. In other words, the sheet ejecting conveyor 32 changes the order of the recording paper sheets in compliance with the page numbers.

In this manner, the ejection order is changed by putting a recording paper sheet into a standby state. However, it is also possible to change the recording paper sheet conveyance speed in the conveyance path 31b in which a recording paper sheet is put into a standby state.

For example, the conveyance speed of the recording paper sheet having the image (3) formed thereon in the conveyance path 31b may be lowered, and the recording paper sheet having the image (3) formed thereon is ejected after the recording paper sheet having the image (2) formed thereon is ejected.

Such control is not necessarily performed by the overall controller 21 of the image forming apparatus main body 20, but may be performed by a controller provided in the post-processing device 30 or by the controller 13 of the print control device 10.

Although only one conveyance path 31b is shown in FIG. 3, two or more conveyance paths 31b may be provided.

With such arrangement, it is possible to take appropriate measures even if two or more recording paper sheets are subjected to image formation processes in an order that does not match the page numbers.

The post-processing device 30 is equivalent to the "sheet ejection processor" of an embodiment of the present invention, and the overall controller 21 is equivalent to the "sheet ejection process controller" of an embodiment of the present invention.

The image forming apparatus main body 20 includes a cycle-down system for saving energy and preventing deterioration of the apparatus. Continuing to operate the image forming apparatus main body 20 during the times in addition to the times for image formation processes causes problems such as unnecessary power consumption and deterioration of the apparatus due to the heat from the fixing device. That is, in the cycle-down system, when a time during which any image formation process is not performed becomes longer than a predetermined time, the operation of each device performing the image formation process in the image forming apparatus main body 20 is set to an energy-saving mode. Therefore, if a time during which any image formation process is not performed becomes longer than the predetermined time, the cycle-down system is activated even within one print job.

In a case where an image formation process is performed again after the start of the cycle-down system, the cycle-down system is stopped and is restored to such a state that an image formation process can be performed. The cycle-down system is controlled by the overall controller 21. The predetermined time for activating the cycle-down system and the energy-saving mode are set in accordance with the contents of the ROM in the overall controller 21, the contents of the storage 15, or the contents set by the user through the operation panel 24.

Next, a process to be performed by the print control device 10 is described. A print processing time of an embodiment of the present invention is the time from the start of a rasterization processing time till the end of the corresponding sheet ejection process.

The print control device 10 receives a print job from an information processing device connected from outside to the image forming apparatus 5. Alternatively, the image reader 23 of the image forming apparatus main body 20 reads an image, and information including settings such as two-side printing or imposition, which are set through the operation panel 24, is acquired as a print job together with the image data read by the image reader 23. These print jobs are stored into the storage 15 of the print control device 10. The predictor 16 predicts the rasterization processing time necessary for rasterizing each set of the image data of each page for forming an image on a recording paper sheet, in accordance with information such as the data amount of each set of image data and the resolution set in the print job. The image data of each page is included in the received print job.

The controller 13 determines the parallel rasterization process order in which the loader 12 rasterizes each set of image data, taking into account the predicted rasterization processing time for each set of the image data of each page for forming an image on a recording paper sheet.

Figures 4A, 4B:
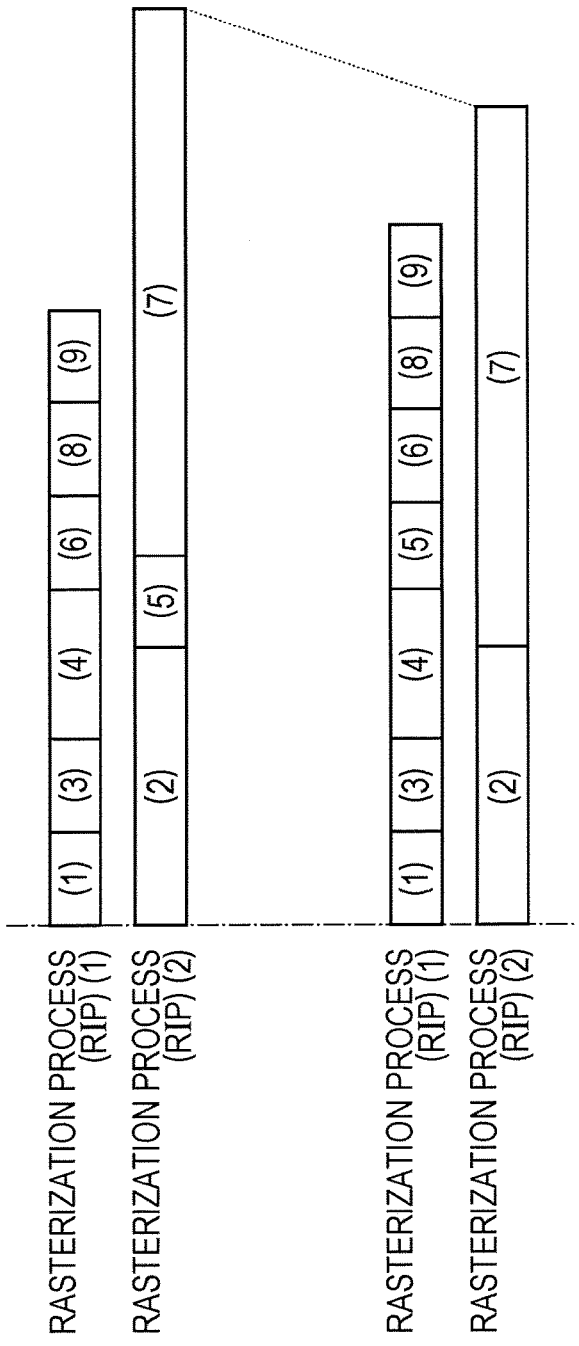
FIGS. 4A and 4B show timing charts relating to parallel rasterization processes in a printing process.

FIGS. 4A and 4B show timing charts relating to the parallel rasterization processes in a printing process.

FIG. 4A shows the rasterization processing times in a case where parallel rasterization processes are performed according to the page numbers, without a change in the order of the starts of rasterization processes for each set of the image data of each page for forming an image on a recording paper sheet. FIG. 4B shows the rasterization processing times in a case where parallel rasterization processes are performed while the order of the starts of rasterization processes for each set of the image data is controlled, with the rasterization processing time for each set of the image data of each page for forming an image on a recording paper sheet being taken into account.

The zones (1) through (9) in FIGS. 4A and 4B indicate the rasterization processing times required for rasterizing the respective sets of the image data of pages (1) to (9) for forming images on recording paper sheets. That is, the time required for the rasterization process for the image data of (2) is longer than that for the image data of (1).

As shown in FIG. 4A, the rasterization processing times vary with the image data of the pages for forming images on recording paper sheets. Therefore, if parallel rasterization processes are started with the multiple cores in the order of pages, there is a possibility that the total rasterization processing time required for completing the rasterization processes for all the image data will become long.

On the other hand, the rasterization processing time of the image data of each page for forming an image on a recording paper sheet is taken into consideration, as shown in FIG. 4B, and the order of the starts of the parallel rasterization processes for the respective sets of image data is determined so that the time from the start of a rasterization process till the end of the rasterization process becomes shorter than in a case where the rasterization processes are performed in any other order. In this manner, the total rasterization processing time can be optimized.

A print processing time is determined primarily by the rasterization processing time, the image formation processing time, and the sheet ejection processing time. Therefore, as the total rasterization processing time becomes shorter, the print processing time also becomes shorter.

In practice, the order of the starts of parallel rasterization processes in FIG. 4B is determined so that the print processing time is minimized. Specifically, the controller temporarily determines the order of the starts of the parallel rasterization processes, and predicts a rough print processing time. The controller then compares the rough print processing time with the print processing time of a case with some other order, and determines the optimum order of the starts of the parallel rasterization processes.

In accordance with the rasterization process order controlled by the controller 13, the loader 12 rasterizes, in parallel, the image data of the respective pages for forming images on recording paper sheets. The raster image data generated by the rasterization process is stored into the storage 15.

In addition to the raster image data obtained by rasterizing each sets of the image data of the pages for forming images on recording paper sheets, the storage 15 stores the order of the pages of the image data included in the print job, the order of the starts of the parallel rasterization processes for the respective sets of the image data of the pages for forming images on recording paper sheets, and the order of the ends of the rasterization processes for the respective sets of the image data. In a case where the order of the starts of the rasterization processes determined by the controller 13 is different from the order of the pages of the image data included in the print job, images formed in accordance with the raster image data generated by the rasterization processes might not match the order of the pages of the image data. Therefore, to change the order of the recording paper sheets on which images have been formed by the image former 22 to the order of the pages of the image data, it is necessary to store the order of the pages of the recording paper sheets subjected to the image formation processes.

Next, a process to be performed by the image forming apparatus main body 20 is described.

The overall controller 21 receives a print job and raster image data from the storage 15 through the I/F unit 14 of the print control device 10, and then activates the image former 22. When the image former 22 forms images on recording paper sheets in accordance with the raster image data, the images are formed in the same order as the order in which the rasterization processes for the respective sets of the image data of the pages for forming the images on recording paper sheets were completed.

FIGS. 5A and 5B are timing charts relating to the parallel rasterization processes, the image formation processes, and the sheet ejection processes in a printing process.

FIG. 5A shows the rasterization processing times in a case where the order of the starts of the rasterization processes for respective sets of image data is determined by taking into account the rasterization processing times for the respective sets of the image data of the pages for forming images on recording paper sheets, the image formation processing times in a case where image formation based on raster image data is performed in the order according to the page numbers, and the sheet ejection processing times when the recording paper sheets subjected to the image formation processes are ejected.

FIG. 5B shows the rasterization processing times in a case where the order of the starts of the rasterization processes for respective sets of image data is determined by taking into account the rasterization processing times for the respective sets of the image data of the pages for forming images on recording paper sheets, the image formation processing times in a case where image formation processes are performed in the same order as the order in which the rasterization processes were completed, and the sheet ejection processing times when the recording paper sheets subjected to the image formation processes are ejected after rearranged in the order according to the page numbers by the post-processing device 30.

In FIG. 5A, with the rasterization processing times for the respective sets of the image data of the pages for forming images on recording paper sheets being taken into account, the rasterization processes are performed in such an order as to optimize the print processing time, and the image formation processes are performed in the order according to the page numbers after raster image data is acquired. After that, the sheet ejection processes are performed in the same order as the order in which the image formation processes were performed. In this manner, the recording paper sheets can be ejected in the same order as the order of the pages in the finished product. However, where the image formation processes are performed in the order according to the page numbers, the image former 22 has a standby time. This is because raster image data is not generated in the same order as the pages in the finished product, and therefore, image formation cannot be performed before the raster image data is generated.

In FIG. 5B, on the other hand, the rasterization processes are performed in such an order as to optimize the print processing time, and the image formation processes are sequentially performed on the raster image data on which the processing has been performed. That is, in FIG. 5A and FIG. 5B, the image formation processes are performed in different orders.

In FIG. 5B, since rasterizing the image data of (2) takes a long time, an image formation process is performed in accordance with the raster image data of (3) before (2). After that, the rasterization process for the image data of (2) is completed, and an image formation process is performed in accordance with the raster image data of (2). After ejecting the recording paper sheet having the raster image data of (2) formed thereon, the post-processing device 30 ejects the recording paper sheet on which an image based on the raster image data of (3) is formed.

At this stage, the storage 15 of the print control device 10 stores the order of the pages of the image data included in the print job and the order of the image formation processes to be performed. The overall controller 21 refers to the information stored in the storage 15, and controls the post-processing device 30 to make a recording paper sheet stand by in the conveyance path 31b of the post-processing device 30, the recording paper sheet not matching the page number according to the order of the pages of the image data included in the print job. The recording paper sheet is the one having the image data of (3) formed thereon, for example. The overall controller 21 further controls the post-processing device 30 to eject the recording paper sheet on which an image has been formed in accordance with other image data, and, when the time that matches the page number comes, eject the recording paper sheet not matching the page number according to the order of the pages.

The control on the timing for the post-processing device 30 to eject a recording paper sheet is performed by referring to the information in the storage 15, and determining whether the recording paper sheet corresponding to the page immediately before the recording paper sheet on which an image has just been formed has been ejected. Further, it is also possible to refer to the information about the order of the pages of the image data included in the print job and the information about the order in which image formation processes are to be performed, and perform control so that the recording paper sheets are associated with the page numbers and are ejected in the order according to the page numbers.

Accordingly, the order in which the recording paper sheets are ejected after the printing process can be changed by the post-processing device 30. The image formation processes are then performed, regardless of the order of the pages in the finished product. In this manner, the image formation processing time can be optimized.

As described above, in this embodiment of the present invention, to optimize the print processing time, the print control device 10 predicts the rasterization processing times for the respective sets of the image data of the pages for forming images on recording paper sheets, the image data being included in a print job. The print control device 10 then determines the order in which parallel rasterization processes are to be performed is determined from the print processing time. In accordance with the raster image data on which the rasterization processes have been performed, the image forming apparatus main body 20 performs image formation in the order in which the rasterization processes have been completed. The recording paper sheets on which images have been formed are rearranged in the order according to the pages in the finished product by the post-processing device 30, and are ejected.

Control Flow

Figure 6:
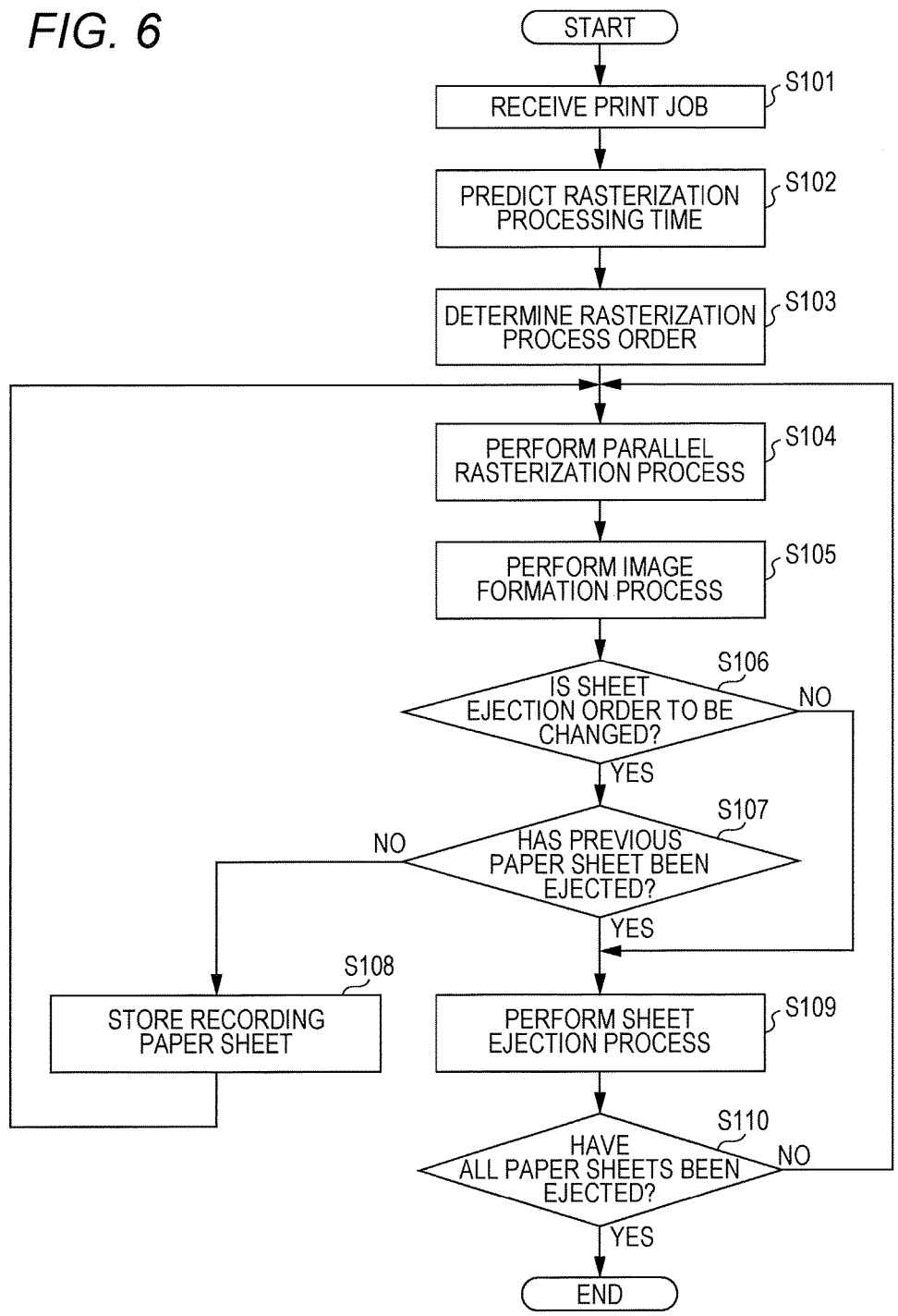
FIG. 6 shows a flowchart of print control according to an embodiment of the present invention.

Referring now to the flowchart in FIG. 6, the flow in the printing process control to be performed in this embodiment of the present invention is described.

The receiver 11 of the print control device 10 receives a print job from an external information processing device connected to the image forming apparatus 5, and stores the print job into the storage 15. Alternatively, a print job including input image data read by the image reader 23 of the image forming apparatus main body 20 is stored into the storage 15 (S101).

The predictor 16 predicts the rasterization processing times for the respective sets of the image data on the pages for forming images on recording paper sheets (S102).

In accordance with the rasterization processing times predicted by the predictor 16 for the respective sets of the image data on the pages for forming images on recording paper sheets, the controller 13 determines the order of the starts of the rasterization processes for the respective sets of the image data of the pages for forming images on recording paper sheets (S103). Information about the order of the pages of the input image data in the print job and information about the rasterization process starting order determined by the controller 13 are stored into the storage 15.

The loader 12 performs rasterization processes in parallel in the rasterization process starting order determined by the controller 13 for the respective sets of the image data, and thus, generates raster image data (S104).

In accordance with the raster image data, the image former 22 performs image formation processes on recording paper sheets in the order in which the rasterization processes have been completed (S105).

The overall controller 21 determines whether to change the order in which the recording paper sheets subjected to the image formation processes are ejected, in accordance with the information about the order of the pages of the input image data in the print job and the information about the order of the starts of the rasterization processes in the storage 15 (S106).

In a case where the sheet ejection order is not to be changed (S106: NO, where the order of the input image data in the print job matches the order of the rasterization processes), the recording paper sheets on which images have been formed are ejected (S109). After the sheet ejection processes are finished, a check is made to determine whether all the images based on the input image data in the print job have been formed on recording paper sheets, and the recording paper sheets have been ejected (S110).

In a case where all the recording paper sheets have been ejected (S110: YES), the printing process control is ended. In a case where not all the recording paper sheets have been ejected (S110: NO), the process returns to S104, to perform a rasterization process on the unprocessed input image data.

In a case where the order in which the recording paper sheets having images formed thereon are ejected is to be changed (S106: YES, the order of the input image data in the print job is different from the order of the rasterization processes), the information that is stored in the storage 15 and indicates the order of the pages of the image data included in the print job is referred to, and a check is made to determine whether an image based on the input image data of the page immediately before the page of the recording paper sheet having an image formed thereon has been formed, and whether the recording paper sheet of the previous page has been ejected (S107).

In a case where the input image data of the page immediately before the recording paper sheet having the image formed thereon has been ejected (S107: YES), the recording paper sheet having the image formed thereon is ejected (S109). In a case where an image based on the input image data of the page immediately before the recording paper sheet having the image formed thereon has not been formed, or the recording paper sheet of the previous page has not been ejected though the image of the previous page has been formed on the recording paper sheet (S107: NO), the recording paper sheet having the image formed thereon is made to stand by in the post-processing device 30 (S108).

After the recording paper sheet is made to stand by, steps S104 through S107 are repeated, and, in step S109, a sheet ejection process is performed in accordance with the order of the pages of the input image data in the print job. If all the recording paper sheets have been ejected, the printing process control is ended.

First Modification

A first modification differs from the above embodiment in that, when the controller 13 determines the order of the starts of rasterization processes for the respective sets of the image data of the pages for forming images on recording paper sheets, the rasterization processing times for the respective sets of the image data and the image formation processing times required in the image forming processes on recording paper sheets are taken into account.

In the first modification, to optimize the print processing time, the rasterization processing times for the respective sets of the image data of the pages for forming images on recording paper sheets are predicted, and the image formation processing times required for forming the images on the recording paper sheets are predicted.

As the image forming processing times are predicted, the total image formation processing time required for forming all the images based on the image data of the pages for forming the images on recording paper sheets can be predicted from the respective rasterization processing times and the order of the starts of the parallel rasterization processes for the respective sets of the image data, the order having been determined by the controller 13.

Optimizing the print processing time while taking into account the rasterization processing times for the respective sets of the image data of the pages for forming images on recording paper sheets, and the image formation processing times required for forming images on recording paper sheets is described below, with reference to FIGS. 7A and 7B.

Figure 7A:
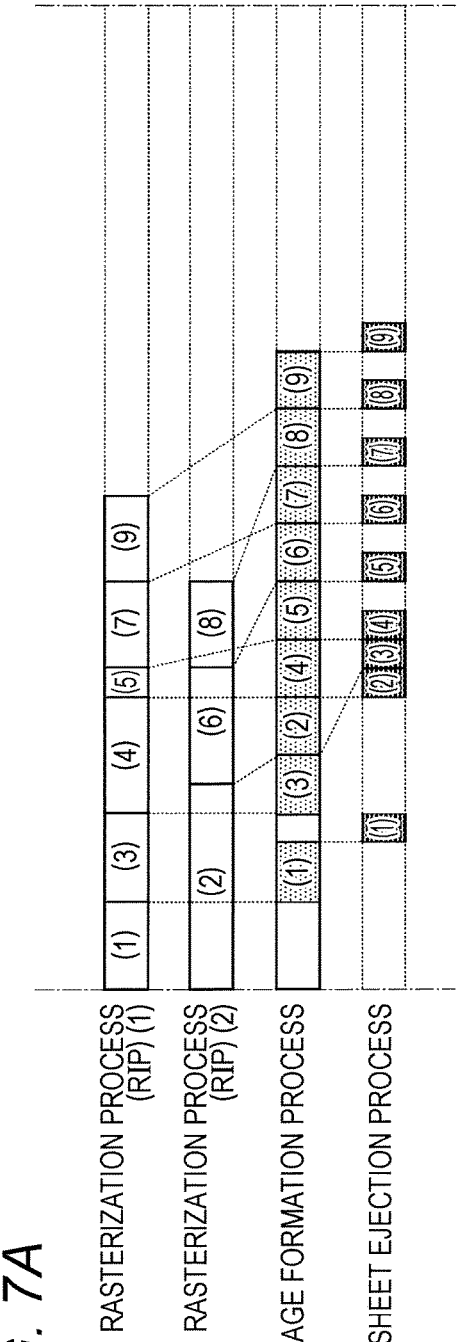
FIGS. 7A and 7B are timing charts relating to parallel rasterization processes, image formation processes, and sheet ejection processes in a printing process.

FIG. 7A is a timing chart showing the rasterization processing times in a case where the order of the starts of the rasterization processes for respective sets of image data is determined by taking into account the rasterization processing times for the respective sets of the image data of the pages for forming images on recording paper sheets, the image formation processing times in a case where image formation processes are sequentially performed starting from the raster image data on which the rasterization process has been performed, and the sheet ejection processing times in a case where the order of the sheet ejection processes is changed so that the recording paper sheets having images formed thereon are rearranged in the order of the pages of the image data included in the print job.

Figure 7B:
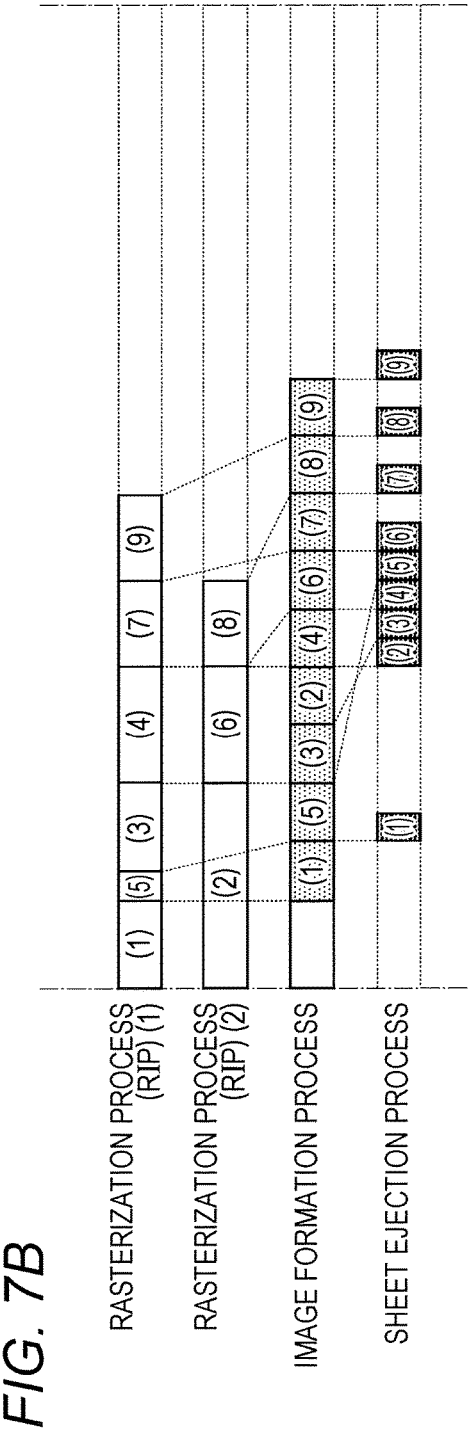

FIG. 7B is a timing chart showing the rasterization processing times in a case where the order of the starts of the rasterization processes for respective sets of image data is determined by taking into account the rasterization processing times for the respective sets of the image data of the pages for forming images on recording paper sheets and the image formation processing times required for forming the images on the recording paper sheets, the image formation processing times in a case where image formation processes are sequentially performed starting from the raster image data on which the rasterization process has been performed, and the sheet ejection processing times in a case where the order of the sheet ejection processes is changed so that the recording paper sheets having images formed thereon are rearranged in the order of the pages of the image data included in the print job.

In FIG. 7A, as the rasterization processing times for the respective sets of the image data of the pages for forming images on recording paper sheets are considered, the total rasterization processing time is optimized. However, there is a wasted time between image formation processes. Specifically, after an image based on the raster image data of (1) is formed, there is a standby time while an image based on the raster image data of (3) is formed.

In FIG. 7B, on the other hand, there is no standby time in the image formation processes. This is because, to optimize the print processing time, the order of the starts of the rasterization processes for the respective sets of the image data is determined so that the total image formation processing time becomes shorter, in accordance with the rasterization processing times for the respective sets of the image data of the pages for forming images on recording paper sheets, and the image formation processing times required for forming the images on the recording paper sheets. Specifically, the order of the starts of the parallel rasterization processes for the respective sets of the image data is determined so that the image formation process based on the raster image data of (5) is performed immediately after the image formation process based on the raster image data of (1), and the image former 22 does not have any standby time during which the image former 22 performs no image formation.

As described above, in the first modification, to optimize the print processing time, the print control device 10 predicts the rasterization processing times required for the respective sets of the image data included in a print job, and also predicts the image formation processing times required for forming the images on the recording paper sheets. In accordance with the rasterization processing times for the respective sets of the image data and the respective image formation processing times, the print control device 10 determines the order of the starts of the parallel rasterization processes. In accordance with the raster image data on which the rasterization processes have been performed, the image forming apparatus main body 20 performs image formation processes in the order in which the rasterization processes have been completed. The recording paper sheets on which images have been formed are rearranged in the order according to the pages in the finished product by the post-processing device 30, and are then ejected.

In the first modification, the two kinds of times, which are the rasterization processing times for the respective sets of image data and the respective image formation processing times are considered in determining the starts of the parallel rasterization processes for the respective sets of the image data. However, this modification is not limited this mode, and the rasterization processing times for the respective sets of image data and the sheet ejection processing times required for ejecting the recording paper sheets having images formed thereon may be considered. As the sheet ejection processing times are predicted, the total sheet ejection processing time required for sequentially forming images on recording paper sheets in accordance with the raster image data subjected to parallel rasterization processes, changing the order of the sheet ejection processes so that the recording paper sheets having the images formed thereon are rearranged in the order of the pages of the image data included in the print job, and ejecting the recording paper sheets can be calculated from the respective rasterization processing times and the order of the starts of the parallel rasterization processes for the respective sets of the image data as determined by the controller 13. As the sheet ejection processing times are considered, the print processing time can be optimized, as in a case where the image formation processing times are taken into account.

The first modification differs from the above embodiment in that, when the controller 13 changes the order of the starts of rasterization processes for the respective sets of image data, the rasterization processing times for the respective sets of the image data and the image formation processing times required for forming images on recording paper sheets or the sheet ejection processing times required for ejecting the recording paper sheets having the images formed thereon are taken into account. Therefore, the control flow of the first modification also differs from that of the above embodiment.

Specifically, in the control flow of the first modification, the rasterization processing times for the respective sets of image data and the respective image formation processing times are predicted in step S102 in the control flow in FIG. 6. Also, the rasterization processing times for the respective sets of image data and the respective sheet ejection processing times are predicted.

In step S102, the total image formation processing time or the total sheet ejection processing time is predicted from the order of the starts of the parallel rasterization processes for the respective sets of image data as determined by the respective rasterization processes and the controller 13. In accordance with the total image formation processing time or the total sheet ejection processing time, the controller 13 determines the order of the starts of the parallel rasterization processes for the respective sets of image data.

The other steps in the control flow in FIG. 6 are the same as those of the above embodiment.

Second Modification

A second modification differs from the above embodiment in that, when the controller 13 changes the order of the starts of rasterization processes for the respective sets of the image data of the pages for forming images on recording paper sheets, the rasterization processing times for the respective sets of the image data, the image formation processing times required for forming images on recording paper sheets, and the sheet ejection processing times required for ejecting the respective recording paper sheets having the images formed thereon are taken into account.

In the second modification, to optimize the print processing time, the rasterization processing times for the respective sets of the image data of the pages for forming images on recording paper sheets are predicted, the image formation processing times required for forming the images on the recording paper sheets are predicted, and the sheet ejection processing times required for ejecting the recording paper sheets having the images formed thereon are predicted.

As the image formation processing times and the sheet ejection processing times are predicted, the total image formation processing time required for forming all the images based on the image data of the pages for forming images on recording paper sheets, and the total sheet ejection processing time required for changing the order of the sheet ejection processes so that the recording paper sheets having the images formed thereon are rearranged in the order of the pages of the image data included in the print job, and ejecting the recording paper sheets can be calculated from the respective rasterization processing times and the order of the starts of the parallel rasterization processes for the respective sets of the image data as determined by the controller 13.

Optimizing the print processing time while taking into account the rasterization processing times for the respective sets of the image data of the pages for forming images on recording paper sheets, the image formation processing times required for forming images on recording paper sheets, and the sheet ejection processing times required for ejecting the recording paper sheets having the images formed thereon is described below, with reference to FIGS. 8A and 8B.

FIG. 8A is a timing chart showing: the rasterization processing times in a case where the order of the starts of the rasterization processes for respective sets of image data is determined by taking into account the rasterization processing times for the respective sets of the image data of the pages for forming images on recording paper sheets and the image formation processing times required for forming the images on the recording paper sheets; the image formation processing times in a case where image formation processes are sequentially performed starting from the raster image data on which the rasterization process has been performed; and the sheet ejection processing times in a case where the order of the sheet ejection processes is changed so that the recording paper sheets having the images formed thereon are rearranged in the order of the pages of the image data included in the print job.

FIG. 8B is a timing chart showing: the rasterization processing times in a case where the order of the starts of the rasterization processes for respective sets of image data is determined by taking into account the rasterization processing times for the respective sets of the image data of the pages for forming images on recording paper sheets, the image formation processing times required for forming the images on the recording paper sheets, and the sheet ejection processing times required for ejecting the recording paper sheets having the images formed thereon; the image formation processing times in a case where image formation processes are sequentially performed starting from the raster image data on which the rasterization process has been performed; and the sheet ejection processing times in a case where the order of the sheet ejection processes is changed so that the recording paper sheets having the images formed thereon are rearranged in the order of the pages of the image data included in the print job.

In FIG. 8A, as the rasterization processing times for the respective sets of the image data of the pages for forming images on recording paper sheets and the image formation processing times required for forming the images on the recording paper sheets are considered, the total rasterization processing time and the total image formation processing time can be shortened. However, there are wasted times between sheet ejection processing times. Specifically, after the image formation process based on the raster image data of (2) is performed, the image formation process based on other raster image data is performed, but any sheet ejection process cannot be performed until the image forming process based on the raster image data of (3) is completed. As a result, there are wasted times between sheet ejection processing times, and the print processing time becomes longer.

In FIG. 8B, on the other hand, the total sheet ejection processing time is shorter than that in FIG. 8A. This is because, to optimize the print processing time, the order of the starts of the rasterization processes for the respective sets of the image data is determined so that the total image formation processing time and the total sheet ejection processing time become shorter, in accordance with the rasterization processing times for the respective sets of the image data of the pages for forming images on recording paper sheets, the image formation processing times required for forming the images on the recording paper sheets, and the sheet ejection processing times required for ejecting the recording paper sheets having the images formed thereon. Specifically, the order of the parallel rasterization processes for the respective sets of image data is determined so that the image data of a page having the smallest page number is rasterized prior to the image data of any other page. Thus, the order of the image formation processes to be performed on recording paper sheet with the respective sets of image data is rearranged so that any standby time will not be generated between any sheet ejection processes.

As described above, in the second modification, to optimize the print processing time, the print control device 10 predicts the rasterization processing times required for the respective sets of the image data included in a print job, and also predicts the image formation processing times required for forming the images on the recording paper sheets and the sheet ejection processing times required for ejecting the recording paper sheets having the images formed thereon. In accordance with the rasterization processing times for the respective sets of the image data, the respective image formation processing times, and the respective sheet ejection processing times, the print control device 10 determines the order of the starts of the parallel rasterization processes. In accordance with the raster image data on which the rasterization processes have been performed, the image forming apparatus main body 20 performs image formation processes in the order in which the rasterization processes have been completed. The recording paper sheets on which images have been formed are rearranged in the order according to the pages in the finished product by the post-processing device 30, and are then ejected.

The second modification differs from the above embodiment in that, when the controller 13 determines the order of the starts of rasterization processes for the respective sets of the image data of the pages for forming images on recording paper sheets, the rasterization processing times for the respective sets of the image data, the image formation processing times required for forming the images on recording paper sheets, and the sheet ejection processing times required for ejecting the recording paper sheets having the images formed thereon are taken into account. Therefore, the control flow of the second modification also differs from that of the above embodiment.

Specifically, in the control flow of the second modification, the rasterization processing times for the respective sets of image data, the respective image formation processing times, and the respective sheet ejection processing times are predicted in step S102 in the control flow in FIG. 6.

In step S102, the total image formation processing time and the total sheet ejection processing time are predicted from the order of the starts of the parallel rasterization processes for the respective sets of image data as determined by the respective rasterization processes and the controller 13. In accordance with the total image formation processing time and the total sheet ejection processing time, the controller 13 determines the order of the starts of the parallel rasterization processes for the respective sets of image data.

The other steps in the control flow in FIG. 6 are the same as those of the above embodiment.

Third Modification

A third modification differs from the above embodiment in that a cycle-down system is set in the image forming apparatus main body 20, and, when the controller 13 determines the order of the starts of rasterization processes for the respective sets of the image data of the pages for forming images on recording paper sheets, a predetermined time after which the cycle-down system is activated is taken into account, as well as the rasterization processing times for the respective sets of the image data, the image formation processing times required for forming images on recording paper sheets, and the sheet ejection processing times required for ejecting the respective recording paper sheets having the images formed thereon.

In the third modification, to optimize the print processing time, the rasterization processing times for the respective sets of the image data of the pages for forming images on recording paper sheets are predicted, the image formation processing times required for forming the images on the recording paper sheets are predicted, and the sheet ejection processing times required for ejecting the recording paper sheets having the images formed thereon are predicted. The predetermined time after which the cycle-down system is activated is taken into account, and the timing of the image formation process to be performed earlier is delayed so that the time intervals at which the image formation processes based on respective raster images are shorter than the predetermined time. With this, the cycle-down system is not activated during one print job, and thus, the print processing time can be optimized.

Optimizing the print processing time while taking into account the rasterization processing times for the respective sets of the image data of the pages for forming images on recording paper sheets, the image formation processing times required for forming images on recording paper sheets, the sheet ejection processing times required for ejecting the recording paper sheets having the images formed thereon, and the predetermined time after which the cycle-down system is activated is described below, with reference to FIGS. 9A and 9B.

FIG. 9A is a timing chart showing: the rasterization processing times in a case where the order of the starts of the rasterization processes for respective sets of image data is determined by taking into account the rasterization processing times for the respective sets of the image data of the pages for forming images on recording paper sheets, the image formation processing times required for forming the images on the recording paper sheets, and the sheet ejection processing times required for ejecting the recording paper sheets having the images formed thereon; the image formation processing times in a case where image formation processes are sequentially performed starting from the raster image data on which the rasterization process has been performed; and the sheet ejection processing times in a case where the order of the sheet ejection processes is changed so that the recording paper sheets having the images formed thereon are rearranged in the order of the pages of the image data included in the print job.

FIG. 9B is a timing chart showing: the rasterization processing times in a case where the order of the starts of the rasterization processes for respective sets of image data is determined by taking into account the rasterization processing times for the respective sets of the image data of the pages for forming images on recording paper sheets, the image formation processing times required for forming the images on the recording paper sheets, the sheet ejection processing times required for ejecting the recording paper sheets having the images formed thereon, and the predetermined time after which the cycle-down system is activated; the image formation processing times in a case where image formation processes are sequentially performed starting from the raster image data on which the rasterization process has been performed, and the timing for the first image formation process is delayed so that the cycle-down system is not activated; and the sheet ejection processing times in a case where the order of the sheet ejection processes is changed so that the recording paper sheets having the images formed thereon are rearranged in the order of the pages of the image data included in the print job.

The cycle-down system is activated in a case where the image former 22 has not performed image formation over a predetermined time. As shown in FIGS. 9A and 9B, if the predetermined time has elapsed since the time of the image formation process based on the raster image data of (1) before the time of the image formation process based on the raster image data of (2), the cycle-down system Is activated. In FIG. 9A, after an image based on the raster image data of (1) is formed, the cycle-down system is activated before an image based on the raster image data of (2) is formed. Once the cycle-down system is activated, a long time is required before the cycle down system stops and the state in which image formation can be performed is restored. Therefore, the print processing time becomes long.

In FIG. 9B, on the other hand, the cycle-down system is not activated. This is because the timing to perform the image formation process based on the raster image data of (1) is changed, and the interval between the image formation process of (1) and the image formation process of (2) is shortened, so that the cycle-down system is not activated during the time from the image formation process based on the image data of (1) till the image formation process based on the raster image data of (2).

As described above, in the third modification, to optimize the print processing time, the print control device 10 predicts the rasterization processing times required for the respective sets of the image data included in a print job, the image formation processing times required for forming images on recording paper sheets, and the sheet ejection processing times required for ejecting the recording paper sheets having the images formed thereon. In accordance with the rasterization processing times for the respective sets of the image data, the respective image formation processing times, and the respective sheet ejection processing times, the print control device 10 changes the order of the starts of the parallel rasterization processes. The image forming apparatus main body 20 changes the timings to perform the image formation processes on the image data subjected to rasterization processes, taking into account the order in which the rasterization processes have been completed and the predetermined time after which the cycle-down system is activated. Images are then formed on recording paper sheets. The recording paper sheets on which images have been formed are rearranged in the order according to the pages in the finished product by the post-processing device 30, and are then ejected.

The third modification differs from the above embodiment in that the cycle-down system is set in the image forming apparatus main body 20, and, when the controller 13 changes the order of the starts of rasterization processes for the respective sets of image data, the predetermined time after which the cycle-down system is activated is taken into account, as well as the rasterization processing times for the respective sets of the image data, and the image formation processing times required for forming images on recording paper sheets or the sheet ejection processing times required for ejecting the respective recording paper sheets having the images formed thereon. Therefore, the control flow of the third modification also differs from that of the above embodiment.

Specifically, in the control flow of the third modification, the rasterization processing times for the respective sets of image data, the respective image formation processing times, and the respective sheet ejection processing times are predicted in step S102 in the control flow in FIG. 6.

In step S102, the total image formation processing time and the total sheet ejection processing time are predicted from the order of the starts of the parallel rasterization processes for the respective sets of image data as determined by the respective rasterization processes and the controller 13. In accordance with the total image formation processing time and the total sheet ejection processing time, the controller 13 determines the order of the starts of the parallel rasterization processes for the respective sets of image data.

In step S105, the overall controller 21 changes the timing at which the image forming process is performed so as not to exceed the predetermined time after which the cycle-down system is activated.

The other steps (other than steps S102 and S105) in the control flow in FIG. 6 are the same as those of the above embodiment.

Further, the image formation processing times in the first through third modifications are predicted by the predictor 16, from information about the recording paper sheets such as the size and the basis weight of the recording paper sheets on which images are to be formed, and the settings of print jobs such as imposition or two-side printing. This is because there are differences in the changes in the conveyance speed due to the size and the basis weight of the recording paper sheets, in the image formation processes at the time of imposition or two-side printing.

Although an embodiment of the present invention and modifications thereof have been described so far, the present invention is not limited to the above embodiment, and changes may be made to it without departing from the spirit of the invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image forming apparatus comprising:
a plurality of rasterization processors that rasterize, in parallel, input image data having page information including page order information, and generate raster image data;
a hardware processor that predicts a rasterization processing time required for the rasterization processors to rasterize input image data of a unit to be subjected to an image formation process on each recording paper sheet, and that determines an order in which the rasterization processors rasterize, in parallel, the input image data of the unit to be subjected to the image formation process on recording paper sheets;
an image former that performs the image formation process based on the raster image data in an order in which the rasterization processors have finished the rasterization processes on the input image data of the unit to be subjected to the image formation process on recording paper sheets; and
a sheet ejection processor that acquires, from the image former, each recording paper sheet subjected to the image formation process by the image former, and performs a sheet ejection process; wherein
the hardware processor determines an order of the recording paper sheets to be ejected by the sheet eject processor, to adjust the order of the recording paper sheets to an order of pages included in the page information,
the hardware processor acquires, from the image former, the recording paper sheets subjected to the image formation process by the image former, and predicts a sheet ejection processing time required for the sheet ejection processor to perform the sheet ejection process, and
in accordance with the rasterization processing time predicted by the hardware processor and the sheet ejection processing time predicted by the hardware processor, the hardware processor determines the order in which the rasterization processors rasterize, in parallel, the input image data of the unit to be subjected to the image formation process on recording paper sheets such that a time from a start of a rasterization process till an end of the sheet ejection process becomes shorter than a time from a start of a rasterization process performed by the rasterization processors performing rasterization processes in the order of the pages included in the page information till the end of the sheet ejection process.

2. The image forming apparatus according to claim 1, wherein
the hardware processor predicts an image formation processing time required for the image former to perform the image formation process based on the raster image data, and,
in accordance with the rasterization processing time and the image formation processing time predicted by the hardware processor, the hardware processor determines such an order that the time from the start of the rasterization process till the end of the sheet ejection process becomes shorter than the time from the start of the rasterization process performed by the rasterization processors performing the rasterization processes in the order of the pages included in the page information till the end of the sheet ejection process.

3. The image forming apparatus according to claim 2, further comprising
a print job memory that stores print job information relating to a size and a basis weight of the recording paper sheets and an image formation condition,
wherein the hardware processor refers to the information stored in the print job memory, to predict the image formation processing time.

4. The image forming apparatus according to claim 1, wherein, when the input image data of the unit for performing image formation on recording paper sheets includes image data of a plurality of page units, the hardware processor regards the image data of the plurality of page units as one set, and predicts the rasterization processing time.

5. An image forming apparatus, comprising:
a plurality of rasterization processors that rasterize, in parallel, input image data having page information including page order information, and generate raster image data;
a hardware processor that predicts a rasterization processing time required for the rasterization processors to rasterize input image data of a unit to be subjected to an image formation process on each recording paper sheet, and that determines an order in which the rasterization processors rasterize, in parallel, the input image data of the unit to be subjected to the image formation process on recording paper sheets;
an image former that performs the image formation process based on the raster image data in an order in which the rasterization processors have finished the rasterization processes on the input image data of the unit to be subjected to the image formation process on recording paper sheets; and
a sheet ejection processor that acquires, from the image former, each recording paper sheet subjected to the image formation process by the image former, and performs a sheet ejection process; wherein
the hardware processor determines an order of the recording paper sheets to be ejected by the sheet eject processor, to adjust the order of the recording paper sheets to an order of pages included in the page information,
in accordance with the rasterization processing time predicted by the hardware processor, the hardware processor determines the order in which the rasterization processors rasterize, in parallel, the input image data of the unit to be subjected to the image formation process on recording paper sheets such that a time from a start of a rasterization process till an end of the sheet ejection process becomes shorter than a time from a start of a rasterization process performed by the rasterization processors performing rasterization processes in the order of the pages included in the page information till the end of the sheet ejection process,
the hardware processor controls a timing at which the image former performs an image formation process on a recording paper sheet,
the image forming apparatus further comprises a storage that stores a predetermined time after which a cycle-down system is activated, when the image former does not perform the image formation process for the predetermined time, and
when a time during which the image former does not perform the image formation process is longer than the predetermined time, the hardware processor controls the timing at which the image former performs the image formation process, to make the time during which the image former does not perform the image formation process shorter than the predetermined time.

6. An image forming method for an image forming apparatus that includes:
a plurality of rasterization processors that rasterize, in parallel, input image data having page information, and generate raster image data; and
a sheet ejection processor that acquires recording paper sheets from an image former, and performs a sheet ejection process, the image former performing an image formation process based on the raster image data on the recording paper sheets, the image forming method comprising:
predicting a rasterization processing time required for rasterizing input image data of a unit to be subjected to the image formation process on recording paper sheets;
performing image formation in an order in which the rasterization processors have finished the rasterization processes in parallel on the input image data of the unit to be subjected to the image formation process on recording paper sheets, the image formation being performed by the image former;
determining an order of the recording paper sheets to be ejected by the sheet ejection processor, to adjust the order of the recording paper sheets to the page information;
acquiring, from the image former, the recording paper sheets subjected to the image formation process performed by the image former;
predicting a sheet ejection processing time required for the sheet ejection processor to perform the sheet ejection process, and,
in accordance with the predicted rasterization processing time and the predicted sheet ejection processing time, determining an order in which the rasterization processors rasterize, in parallel, the input image data of the unit to be subjected to the image formation process on recording paper sheets, so that a time from a start of the rasterization process till an end of the sheet ejection process becomes shorter than a time from a start of the rasterization process performed by the rasterization processors performing the rasterization processes in the order of the pages included in the page information till the end of the sheet ejection process, the order being determined by a hardware processor.

7. The image forming method according to claim 6, further comprising:

predicting an image formation processing time required for the image former to perform the image formation process based on the raster image data, and, in accordance with the predicted rasterization processing time and the predicted image formation processing time, determining an order in which the rasterization processors rasterize, in parallel, the input image data of the unit to be subjected to the image formation process on recording paper sheets, so that the time from the start of the rasterization process till the end of the sheet ejection process becomes shorter than the time from the start of the rasterization process performed by the rasterization processors performing the rasterization processes in the order of the pages included in the page information till the end of the sheet ejection process, the order being determined by the hardware processor.

8. The image forming method according to claim 7, wherein the image formation processing time is predicted referring to print job information relating to a size and a basis weight of the recording paper sheets and an image formation condition.

9. The image forming method according to claim 6, wherein, when the input image data of the unit for performing image formation on recording paper sheets includes image data of a plurality of page units, the image data of the plurality of page units is regarded as one set, and the rasterization processing time is predicted.

10. A non-transitory recording medium storing a computer readable program to be executed by an image forming apparatus, the program causing a computer to implement the image forming method according to claim 6.

11. The An image forming for an image forming apparatus that includes:

a plurality of rasterization processors that rasterize, in parallel, input image data having page information, and generate raster image data; and a sheet ejection processor that acquires recording paper sheets from an image former, and performs a sheet ejection process, the image former performing an image formation process based on the raster image data on the recording paper sheets, the image forming method comprising:

predicting a rasterization processing time required for rasterizing input image data of a unit to be subjected to the image formation process on recording paper sheets;

determining an order in which the rasterization processors rasterize, in parallel, the input image data of the unit to be subjected to the image formation process in accordance with the predicted rasterization processing time, so that a time from a start of a rasterization process till an end of the sheet ejection process becomes shorter than a time from a start of a rasterization process performed by the rasterization processors performing rasterization processes in the order of the pages included in the page information till the end of the sheet ejection process, the order being determined by a hardware processor;

performing image formation in an order in which the rasterization processors have finished the rasterization processes in parallel on the input image data of the unit to be subjected to the image formation process on recording paper sheets, the image formation being performed by the image former; and determining an order of the recording paper sheets to be ejected by the sheet ejection processor, to adjust the order of the recording paper sheets to the page information, wherein the image forming apparatus includes a storage that stores a predetermined time after which a cycle-down system is activated, when the image former does not perform the image formation process for the predetermined time, and, when a time during which the image former does not perform the image formation process is longer than the predetermined time, the hardware processor controls a timing at the image formation process is performed, to make the time during which the image former does not perform the image formation process shorter than the predetermined time.

* * * * *